United States Patent
Skrbic et al.

(10) Patent No.: US 11,207,998 B2
(45) Date of Patent: Dec. 28, 2021

(54) CHARGING STATION AND METHOD FOR OPERATING A CHARGING STATION INCLUDING AUTOMATICALLY CLOSING A FUSE

(71) Applicants: Srdan Skrbic, Dortmund (DE); Jürgen Waffner, Essen (DE)

(72) Inventors: Srdan Skrbic, Dortmund (DE); Jürgen Waffner, Essen (DE)

(73) Assignee: innogy SE, Essen (DE)

( * ) Notice: Subject to any disclaimer, the term of this patent is extended or adjusted under 35 U.S.C. 154(b) by 496 days.

(21) Appl. No.: 16/158,571

(22) Filed: Oct. 12, 2018

(65) Prior Publication Data
US 2019/0039469 A1    Feb. 7, 2019

Related U.S. Application Data

(63) Continuation of application No. PCT/EP2017/050242, filed on Jan. 6, 2017.

(30) Foreign Application Priority Data

Apr. 12, 2016   (DE) ..................... 10 2016 106 700.8

(51) Int. Cl.
*B60L 53/60*    (2019.01)
*B60L 3/04*     (2006.01)
(Continued)

(52) U.S. Cl.
CPC ............ *B60L 53/60* (2019.02); *B60L 3/0069* (2013.01); *B60L 3/04* (2013.01); *B60L 53/14* (2019.02);
(Continued)

(58) Field of Classification Search
CPC .......... B60L 53/60; B60L 53/31; B60L 53/14; B60L 53/18; B60L 53/16; B60L 53/665;
(Continued)

(56) References Cited

U.S. PATENT DOCUMENTS

2012/0286729 A1    11/2012   Yegin et al.
2013/0271075 A1    10/2013   Restrepo et al.
(Continued)

FOREIGN PATENT DOCUMENTS

CN     102 931 713 A    2/2013
CN     103 187 777 A    7/2013
(Continued)

*Primary Examiner* — Richard Isla
*Assistant Examiner* — Manuel Hernandez
(74) *Attorney, Agent, or Firm* — Reinhart Boerner Van Deuren P.C.

(57) ABSTRACT

Method for operating a charging station for electric vehicles wherein a switching state of at least one fuse arranged between a grid connection and a charging cable connection is monitored and with the aid of a contact state a connection to and a separation from the charging cable connection by a charging cable is monitored. The charging station can continue to be kept in operation in the case of a fault at the vehicle side when an opening of the fuse occurring during a connection of the charging cable to the charging cable connection is detected with the aid of the monitored switching state and in the case of an opening detected in this manner following a detected separation of the charging cable from the charging cable connection, the fuse is autonomously closed.

12 Claims, 2 Drawing Sheets

(51) Int. Cl.
*H02J 7/00* (2006.01)
*B60L 53/31* (2019.01)
*B60L 53/14* (2019.01)
*B60L 53/16* (2019.01)
*B60L 53/66* (2019.01)
*B60L 53/18* (2019.01)
*B60L 3/00* (2019.01)

(52) U.S. Cl.
CPC ............ *B60L 53/16* (2019.02); *B60L 53/18* (2019.02); *B60L 53/31* (2019.02); *B60L 53/665* (2019.02); *H02J 7/0027* (2013.01); *H02J 7/0031* (2013.01); *H02J 7/0036* (2013.01); *H02J 7/0029* (2013.01); *Y02T 90/14* (2013.01)

(58) Field of Classification Search
CPC ........ B60L 3/04; B60L 3/0069; H02J 7/0036; H02J 7/0027; H02J 7/0031; H02J 7/0045; H02J 7/0029; Y02T 10/70; Y02T 10/7072; Y02T 90/12; Y02T 90/16; Y02T 90/14
USPC .......................................... 320/109
See application file for complete search history.

(56) References Cited

U.S. PATENT DOCUMENTS

2014/0103878 A1* 4/2014 Albertson ............. H01G 11/18
 320/127
2014/0111013 A1* 4/2014 Desbois-Renaudin ....................
 H02J 7/0063
 307/52
2014/0211345 A1* 7/2014 Thompson ........... H02H 1/0061
 361/42

FOREIGN PATENT DOCUMENTS

| | | |
|---|---|---|
| CN | 103 209 857 A | 7/2013 |
| CN | 103 313 871 A | 9/2013 |
| CN | 103 476 628 A | 12/2013 |
| DE | 10 2009 034 887 A1 | 2/2011 |
| DE | 20 2011 004 515 U1 | 12/2011 |
| DE | 10 2010 043 291 A1 | 5/2012 |
| DE | 10 2011 010 774 A1 | 8/2012 |
| DE | 10 2012 103 208 A1 | 10/2013 |
| EP | 2 505 415 A2 | 10/2012 |
| EP | 2 767 430 A1 | 8/2014 |
| WO | WO 2014/015907 A1 | 1/2014 |

* cited by examiner

CHARGING STATION AND METHOD FOR OPERATING A CHARGING STATION INCLUDING AUTOMATICALLY CLOSING A FUSE

CROSS-REFERENCE TO RELATED PATENT APPLICATIONS

This application is a continuation of PCT/EP2017/050242, filed Jan. 6, 2017, which claims priority to German Application No. 10 2016 106 700.8, filed Apr. 12, 2016, the entire teachings and disclosure of which are incorporated herein by reference thereto.

FIELD

The subject matter relates to a method for operating a charging station for electric vehicles and such a charging station.

BACKGROUND

With the prevalence of electric charging stations for electric vehicles, the interest of operators of such charging stations to operate them as cost-efficiently and reliably as possible is increasing. Due to the decentralised distribution of the charging stations, it is necessary to keep the number of manual maintenances and interventions as low as possible. Unlike conventional pump systems for liquid fuels, which make the fuel available irrespective of the functionality of the vehicles to be filled, there is, however, a galvanic coupling between vehicle and charging station in the area of electric charging stations.

This galvanic coupling between vehicle and charging station is, in this respect, problematic as electric malfunctions within the vehicle coupled to the charging station directly impact the charging station and possibly also lead to malfunctions there. Quite a concise example for this is for example that a maximum permissible current strength is exceeded within the charging station by a defective charger in the electric vehicle. Another example may be defective insulation of the electric phases to one another inside the electric vehicle. Fault currents caused hereby, even though they may be small, could lead to a triggering of fault current fuses.

As soon as a fuse has been triggered inside the charging station, the charging station can no longer be used for the current and further charging operations. Nowadays, it is necessary for a service technician to visit the charging station and manually switch the fuse back on.

It is therefore the objective object to increase the availability of charging stations.

BRIEF SUMMARY

This object is solved by embodiments of a method and a device as disclosed herein.

It has been found that triggering of a fuse inside a charging station can also be caused by a malfunction inside the vehicle connected to the charging station. It has also been found that in these cases a manual reset of the fuse may be unnecessary. In particular the inventors have found that after the vehicle, which caused the triggering of the fuse, has been separated from the charging station, the charging station could continue to be operated under normal circumstances. However, it is only problematic when the triggered fuse has to normally be manually reset.

On the other hand, an automatic reset of the fuse is not readily possible for safety reasons. For the case where a fault has occurred in the charging station, an autonomous reset of the fuse is not desirable. For this reason, the inventors recognised that detection of the state of the charging station, in particular the contact state of the charging station with the charging cable during the triggering of the fuse allows secure autonomous resetting of the fuse. To this end, it is according to the subject matter proposed for a switching state of at least one fuse arranged between a grid connection and a charging cable connection to firstly be monitored.

The grid connection is generally a local grid connection or a medium voltage connection. The grid connection is guided in an electrically-insulated manner into the charging station via suitable connections and is secured there via at least one fuse. In this case, each single phase of the grid connection is in particular secured via a fuse. On the output of the fuses, the phases are guided via charging electronics and measurement devices to the electric plug contacts for the charging cable.

As soon as a charging cable is inserted into the charging station and for example a readiness to charge has been signalled to the charging station, the charging operation begins and the charging current is released. It may now happen that during a charging operation a fuse triggers and the connection between grid connection and the charging cable connection electrically separates. Such a separation can be detected based on the switching state of the fuse.

The separation of the connection between grid connection and charging cable connection is caused by an opening of the fuse. If it is now detected that the opening of the fuse occurs during a connection of the charging cable to the charging cable connection, the fuse can according to the subject matter, be automatically and autonomously closed again. The autonomous closure of the fuse in particular only takes place when the charging cable has been separated from the charging cable connection. To this end, the contact state of the charging cable to the charging cable connection is monitored and it is determined whether the charging cable is connected to the charging cable connection or is separated therefrom. If a separation is detected, i.e. the charging cable is removed from the charging cable connection and it has also been determined that previously, during this connection of the charging cable to the charging cable connection, the fuse has been triggered, it is now proposed that this opening of the fuse is autonomously reversed whereby the fuse is autonomously closed.

The inventors have recognised that this autonomous closure of the fuse does not impair the electrical safety of the charging station. In fact it is possible, in the case of a fault inside the charging cable or the electric vehicle, which is charging at that moment, to make the failure of the charging station caused as a result automatically reversed. If the fault occurred during the charging operation inside the charging station, the fuse will be opened again, after it has been autonomously closed, if this fault occurs again. Since in such a case, a vehicle may not be connected to the charging station, i.e. the contact state of the charging cable has been recognised as "separation", an autonomous closure of the fuse no longer takes place according to the subject matter and the charging station remains switched off. In such a case, a technician can manually fix the fault.

The contact state can be mechanically or electrically monitored. It can be monitored by a proximity switch, a micro switch, an optical detector or the like whether the charging cable is mechanically connected to the charging cable connection. A corresponding contact state can be issued. Electric monitoring of the contact state of the charging cable is also possible. In this case, the pilot signal can, for example, be monitored at the electric connection of the cable. In addition to neutral, the phase conductors and earth conductor, a charging cable normally has at least one additional signal conductor, which is designated adequately as the pilot conductor. The vehicle can exchange its readiness to charge with the charging station via a pilot signal. With the aid of the pilot signal, it can be monitored whether a charging cable is connected to the charging cable connection. If no pilot signal is detectable, the contact state can for example be set to "separation". If a pilot signal is detectable, the contact state can e.g. be set to "connection". The contact state can be monitored by setting a bit. The "connection" state can e.g. be stored logically as 1 and the "separation" state logically as 0.

It is also possible for the contact state to be measured electrically via a resistance of the cable. In general, charging cables have a standardised resistance such that the charging station can measure whether a reliable charging cable is connected. If a measurement of the resistance fails, the contact state can also be set to "separation". If the measurement is positive, the contact state can be set to "connection". A secure detection of the charging cable can take place at the charging cable connection by the electric and/or mechanical recording of the contact state.

With the aid of the monitoring process of the contact state, it is possible to enable a conditioned autonomous closure of the at least one fuse. If the fault occurred during a connection of the charging cable to the charging cable connection and in doing so the fuse was opened, the fuse can be autonomously closed after the charging cable has been removed from the charging cable connection according to the subject matter. In all other cases, i.e. when the fuse triggers, without the charging cable being connected to the charging cable connection, the contact state being detected as "separation", autonomous closure of the fuse does not take place since then the fault occurred, with high probability, inside the charging station.

As already mentioned, a charging station can comprise more than one fuse. All three phases of the charging station are in particular individually secured. In addition to a load safety switch, a fault current safety switch can also be used in particular for each phase. In this respect, the fuse according to the subject matter at least preferably comprises a load switch or load safety switch and a fault current safety switch.

Triggering the fuse may also take place temperature-affected. In particular in the case of an excessively high charging current, the temperature in the fuse may rise and ultimately lead to an opening of the fuse. Such a triggering of the fuse due to the temperature being exceeded can result in the autonomous closure either being prevented or only being carried out after a certain time.

For this reason, it is proposed according to an embodiment that in the case a maximum temperature is exceeded, the autonomous closure is prevented. On the other hand, it is also possible that a certain time is waited until an autonomous closure. This may be for example be appropriate if, owing to a fault, the maximum charging capacity has been exceeded and as a result the temperature inside the charging station exceeded a limit value. If a new charging operation is now supposed to be carried out with another charging cable or another electric vehicle, this may generally operate at normal charging capacity. Since the temperature has, however, already been exceeded, the normal charging capacity of the intact vehicle leads to the temperature inside the charging station not reducing fast enough. To prevent this, the fuse is closed only after a certain time such that a subsequent charging operation then only starts when it can be assumed that the temperature inside the charging station has reduced to an acceptable value, i.e. under a limit value.

It is also proposed that a charging capacity for a charging operation is reduced with respect to a standard charging capacity after the autonomous closure. This is in particular the case when a temperature has exceeded a limit value. The reduction of the charging capacity with respect to a standard capacity can for example take place as a result of the charging station signalling the charging regulator inside the vehicle to reduce the charging capacity. The reduced charging capacity ensures that the temperature inside the charging station does not rise further or even reduces.

According to an embodiment, it is proposed that the fuse is closed autonomously in the charging station independent of a communication with a control centre arranged spatially remote. It has been recognised that the autonomous closure of the fuse can lead to an increase in the availability of the charging stations in case when communication between an individual charging station and a control centre is not possible. Precisely because the charging station can autonomously close the fuse, the charging station can increase its availability. No checking or regulating is required by a control centre.

The closure of the fuse can take place via a motorised actuator. The motorised actuator can in particular be activated when an opening of the fuse has been detected and it has also been detected that this opening took place during the contact state "connection" and the contact state passed to the "separation" state.

According to an embodiment, it is proposed that the grid connection is multi-phase. By way of the multi-phase grid connection, it is possible for the electric vehicle to simultaneously charge on multiple phases which is, however, dependent upon the ability of the charging regulator inside the electric vehicle. If charging takes place on multiple phases, it may happen that only one fuse on one phase triggers and opens. However, it has been recognised that the autonomous closure is always carried out on all fuses, irrespective of whether all fuses have also actually triggered. This means that when only one of the multiple fuses has triggered and the signal takes places to automatically close the fuse owing to the above-mentioned conditions, all fuses are autonomously closed. The closure in particular takes place via a mechanical actuator, in particular a motorised actuator. This actuator drives all fuses equally irrespective of whether they were previously opened or closed. This ensures that after the fuse is automatically closed, all phases are available for a subsequent charge.

According to an embodiment, it is proposed that after an autonomous closure of the fuse, its switching state is monitored and that in the case of an opening of the fuse without a detected connection of the charging cable to the charging cable connection, an interruption signal is transmitted to a spatially remote control centre. The opening of the fuse can, on the one hand, be caused by the charging cable or the electric vehicle connected to the charging cable connection, on the other hand by an electrical fault inside the charging station. If a fault occurs inside the charging station and the autonomous closure takes place, after the charging cable has been separated from the charging cable connection, the fuse is generally triggered again if the fault still remains. Therefore, opening of the fuse should be expected once again after the autonomous closure. In this case however, it is detected that the contact state is at "separation", thus no charging cable is connected to the charging cable connection. This internal interruption inside the charging station must be fixed manually as before. In order to enable a repair as swiftly as possible, it is objectively proposed to transmit an interruption signal.

According to an embodiment, it is proposed that a time period is determined between a detected separation of the charging cable from the charging cable connection and the autonomous closure of the fuse. It is in particular proposed that the time period constantly grows, depending on the number of detected openings within an interval. It may happen that a defective charging cable or a defective electric vehicle is connected to a charging station. The defect can lead to the fuse opening. After the charging cable has been removed, the fuse is autonomously closed again according to the subject matter. If the user of this defective charging cable or the defective electric vehicle then however would like to reinitiate a charging operation, he plugs the charging cable back into the charging station directly after removing it. The fuse would then again open after the autonomous closure. This operation would be repeated until the user stops plugging and unplugging his charging cable. To prevent continuous opening and closing of the fuse taking place, it is checked whether a charging cable is plugged in within a certain interval after removal. In general, if the same user unplugs and plugs the charging cable, this interval is short. On the other hand, if a new user wishes to charge at the charging station, a certain time will pass, e.g. at least one minute.

If the first unplugging is detected, the interval can thus begin. If the charging cable is plugged in again quickly, i.e. within a certain interval, the number of the detected openings will be increased by one since the fuse triggers again owing to the defect in the charging cable or electric vehicle. If the user removes the charging cable and plugs it in again, the number of the detected openings will be increased by one and the time period, until the fuse closes, can be incremented.

After this time period has passed, the fuse is closed again if the charging cable has been removed from the charging cable connection. The number will then be increased by one. If the user removes the cable again and plugs it in again, the time period is again longer owing to the number two and in turn lasts longer until the fuse closes autonomously. This leads the user to stop plugging their defective charging cable or their defective vehicle into the charging station again.

To ensure that the interval is not too short, it is also proposed that after every detected opening within an interval, this interval is extended by one time period, in particular by the previously determined time period between the detected removal and the closure of the fuse.

According to an embodiment, it is proposed that a number of detected openings is determined within an interval. The interval can in particular begin when a first opening has been detected or when a first autonomous closure takes place. The number of detected openings is reset after this interval passes, in particular it is set to zero. If a maximum number of detected openings is exceeded, the autonomous closure can be prevented. This should in particular prevent attempts at sabotage, in the case of which opening of the fuse is deliberately carried out.

A further aspect is a charging station according to Claim 12. The fuse is preferably configured to detect an electrical fault at least at the charging cable connection. The fuse is also configured to switch an electric connection between the grid connection and the charging cable connection.

BRIEF DESCRIPTION OF THE DRAWINGS

The subject matter will be explained in detail below based on a drawing showing embodiments. In the drawing is shown.

DETAILED DESCRIPTION

Figure 1:
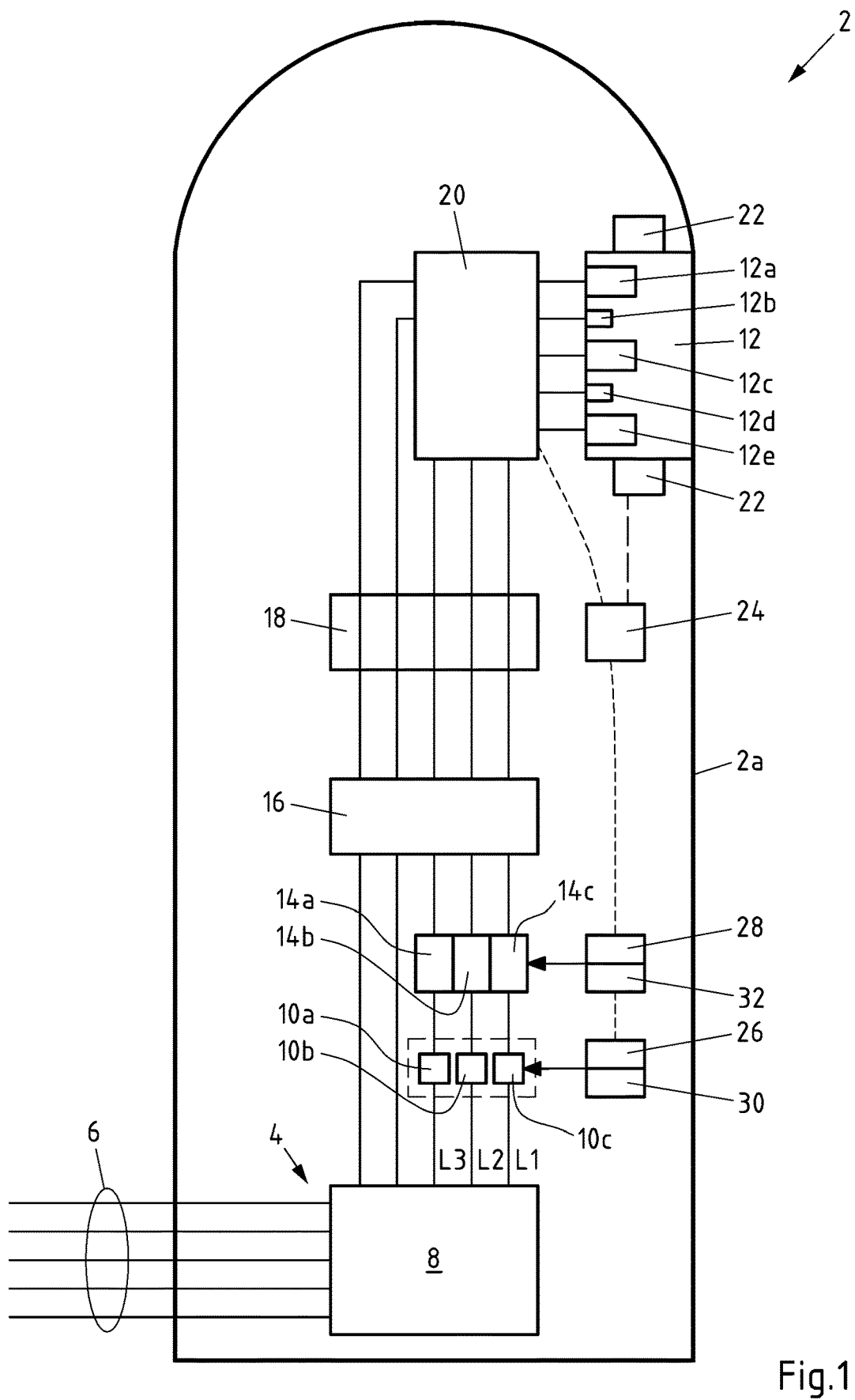
FIG. 1 shows a charging station according to the subject matter.

FIG. 1 shows a charging station 2 with a housing 2a. The charging station 2 is connected to a local grid 6 or a medium voltage grid via a grid connection. The local grid 6, in particular a 0.4 kV grid, is tri-phase and has a neutral and a protective earth conductor. The grid connection 4 is connected to a connection box 8, in which all electrically required connections to connect the local grid 6 to the charging station 2 are present.

The three phases L1, L2, L3 are guided via the connection box 8 to a fuse 10a-c formed as a load safety switch. The fuses 10a-c are in particular designed for maximum currents of for example 16A. The fuse 10a-c are arranged between the grid connection 4 and a charging cable connection 12.

Outside of the fuse 10a-c, fault current safety switches 14a-c are in particular provided for each phase. The fault current safety switches 14a-c monitor a fault current in each phase. Outside of the fault current safety switches 14a-c is a charging control circuit 16 and a measurement circuit 18 which are not explained in further detail for the sake of clarity. The charging control circuit 16 or the measurement circuit 18 have communication means in order to communicate with a control centre, in particular in order to also transmit an interruption signal, mentioned below, in particular by radio or also in a wired manner to a control centre.

Outside of the measurement circuit 18, a detection device 20 is provided and outside of the detection device 20, the charging cable connection 12 with the electric contacts 12a-e is arranged which are representative of the electric contacts inside a charging cable connection 12.

The charging station 2 is traditionally operated such that a charging cable, not shown, is plugged into the charging cable connection 12 with its plug. Communication then takes place via the charging control circuit 16 and/or the measurement circuit 18 with an electric vehicle in which the charging readiness of the electric vehicle is signalled. After corresponding charging readiness, the charging current is released by the charging control circuit 16 which flows at the agreed amount and for the agreed time or for an agreed capacity or the like between the grid connection 4 and the electric vehicle.

To monitor whether a charging cable is plugged into the charging cable connection 12, a detection device 20 can be operated as an electric detection device and/or a detection device 22 as a mechanical detection device.

The electric detection device 20 monitors the electric state of the contacts 12a-e, in particular whether a pilot signal is for example detected. The detection device 20 can also monitor a resistance between at least two of the contacts 12a-c, this resistance for example being representative of a charging cable which is plugged into the charging cable connection.

The detection device 22 can for example be an optical switch which monitors whether the charging cable is plugged in the charging cable connection 12. The detection device 22 can also be a micro switch or a proximity sensor, by means of which it can be monitored whether the plug of a charging cable is plugged in the charging cable connection 12.

The detection devices 20, 22 transmit a contact state to an evaluation circuit 24. A contact state can either be "connection" (e.g. logically 1) or "separation" (e.g. logically 0). The contact state "connection" signals that a charging cable is plugged into the charging cable connection 12. The contact state "separation" signals that a charging cable is not plugged in the charging cable connection 12. A state transition from "connection" to "separation" can then take place if a charging cable is removed from the charging cable connection 12. Such a state change can also be transmitted to the evaluation circuit 24.

Moreover, monitoring devices 26, 28 are provided on the load safety switches 10a-c and on the fault current safety switches 14a-c. The monitoring devices 26, 28 can be integral components of the fuse 10a-c, 14a-c or external thereto. With the aid of the monitoring devices 26, 28, it can be monitored whether a fuse is closed or open. Such a switching state can for example be "open" or "closed". A change of the switching state can also be transmitted by the monitoring devices 26, 28 to the evaluation device 24.

In addition to the monitoring devices 26, 28, respectively one switching device 30, 32 can be integrally provided in the fuses 10a-c, 14a-c or spatially separated therefrom, but in operative connection therewith. With the aid of the switching devices 30, 32, which is for example a motorised actuator, each one of the fuses 10a-c, 14a-c are mechanically and electrically closed. The switching devices 30, 32 can be actuated by the evaluation circuit 24 and the opened fuses optionally autonomously closed.

Figure 2:
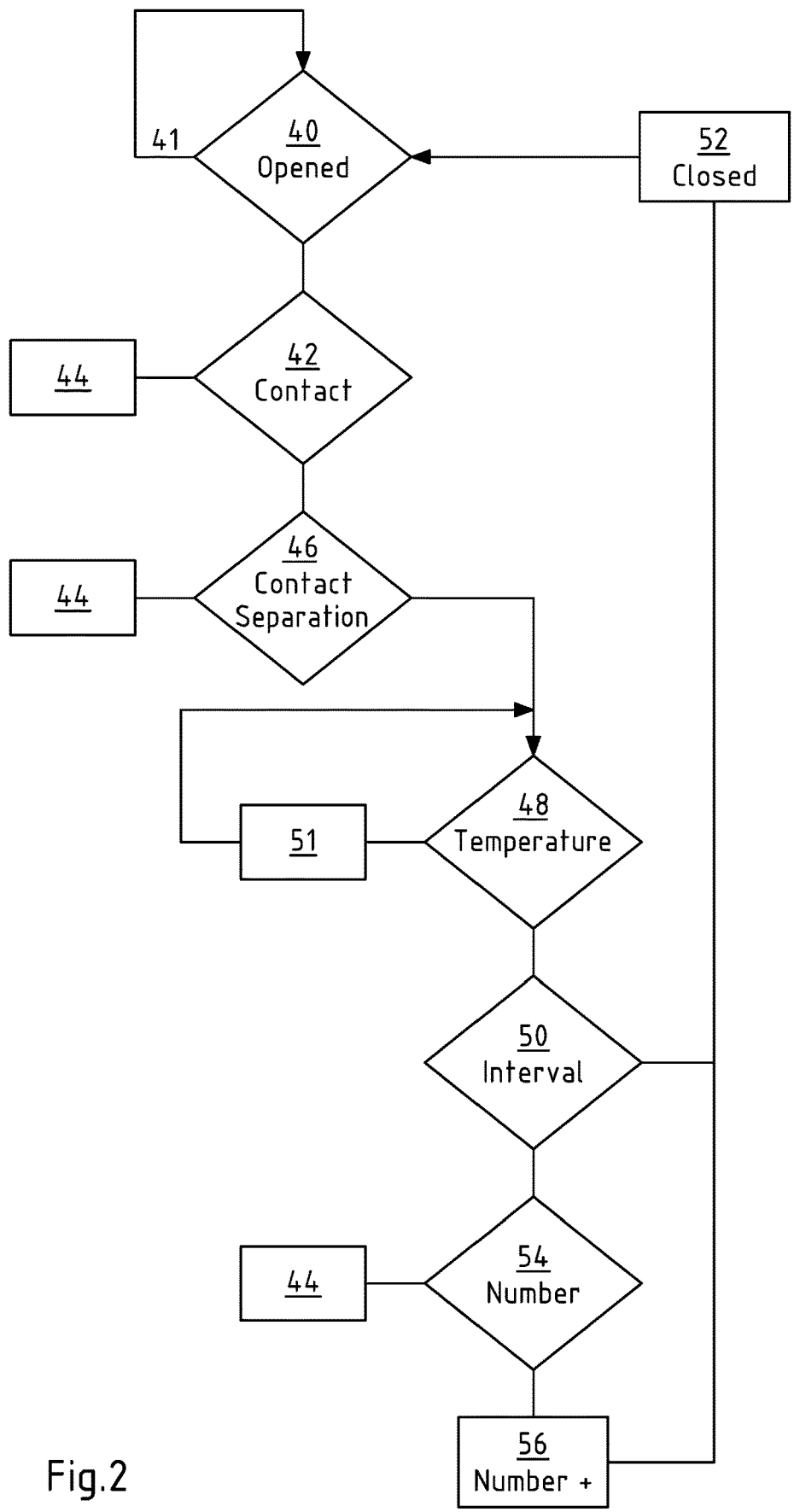
FIG. 2 shows a flow diagram of a process according to the subject matter.

The charging station 2 is objectively operated corresponding to an exemplary embodiment, as described in FIG. 2.

The monitoring devices 26, 28 initially continuously monitor the switching state of the fuses 10a-c, 14a-c in step 40. If the fuses are closed, the monitoring remains in the monitoring loop 41.

It may occur that one or a plurality of fuses 10a-c, 14a-c trigger and their switching state changes from "closed" to "open". In this case, the process is branched off to step 42 by the contact state at the charging cable connection 12 being monitored by means of the detection devices 20, 22. If the contact state is at "separation" at the time of the opening of the fuse, an interruption signal is emitted in step 44.

If, on the other hand, the contact state at the time of opening is at "connection", the process is branched off into step 46. If the contact state does not change from "connection" to "separation" within a very long time interval, for example more than 12 or 24 hours, an interruption signal 44 is also transmitted. On the other hand, the process is branched off into step 48 when a state change of the contact state from "connection" to "separation" is detected in step 46. In this case, it has been determined that an opening of the fuse, as determined in step 40, occurred while a charging cable was connected and the charging cable has been subsequently removed. This may already be sufficient to cause an autonomous closure and possibly to branch off to step 52.

The steps described below are optional and alternatively or cumulatively possible. Moreover, the following steps do not have to necessarily be maintained in the described sequence. Individual steps may also be used between steps 40 to 46 without departing from the concept of the subject matter.

The temperature of the charging station 2 and/or the fuses 10a-c, 14a-c is monitored in step 48. If the temperature exceeds a limit value, a certain time is waited in step 51 via a timing element and subsequently the temperature can be checked again in step 48. It may be possible for the process to be branched off into an interruption signal in step 44 proceeding from step 48 if a limit value is exceeded.

If the temperature, however, falls below a limit value, the process is branched off proceeding from step 48 into step 50.

It is monitored in step 50 whether a time interval has passed since the last opening of a fuse. Such a time interval can, for example, be 10 minutes, 15 minutes or the like. If the time interval has not yet passed, the last opening was only a short time ago and it may be that a user would like to start a new charging attempt with a defective cable or a defective electric vehicle.

If the interval has passed, the process is branched off into step 52 in which the evaluation circuit 24 emits a control pulse to the switching devices 30, 32. The switching devices 30, 32 are preferably operated in a motorised manner and close all fuses 10a-c, 14a-c when a control impulse is received, irrespective of their current switching state.

If, however, the interval has not yet passed, the process is branched off into step 54, in which a counter is checked, which counts the number of failed attempts. If the counter variable in the counter is above a limit value, it can be assumed that the user has carried out a number of attempts with a defective cable or a defective electric vehicle. A limit value can for example be 5 or 10. In this case, an interruption signal 44 can also be emitted. It is also possible that in this case the progress of the method is interrupted for example for 1 hour, 2 hours or 3 hours via a timing element.

If the counter is not yet at its limit value, the counter is increased by one in step 56. However, it is possible that a timing element is actuated via an adjustable timing element, depending on the value of the counter variables. The greater the counter variable, the longer the timing element delays the progress of the described method step 56. After the delayed time has passed, which may be dependent upon the counter variables, the process can be branched off from step 56 to step 52 in which an automatic and autonomous closure of the fuses 1-a-c, 14a-c is effected by means of the evaluation circuit 24 and the switching device 30, 32.

Following the autonomous closure, the operation begins from the start and it is monitored in step 40 whether the fuses 10a-c, 14a-c are closed or their switching state changed to open.

With the aid of the method and the device shown, it is possible to increase the availability of charging stations in a particularly easy manner. In addition, the maintenance effort of charging stations is reduced since fault conditions in the charging stations do not necessarily lead to a failure of said charging stations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for operating a charging station for electric vehicles, comprising the steps of:
   monitoring a switching state of at least one fuse arranged between a grid connection and a charging cable connection; and
   monitoring, with the aid of a contact state, a connection to and a separation from the charging cable connection by a charging cable,
   detecting with the aid of the monitored switching state an opening of the fuse occurring during a connection of the charging cable to the charging cable connection; and
   automatically closing the fuse in the case of an opening detected following a detected separation of the charging cable from the charging cable connection;
   further comprising determining a time period between a detected separation of the charging cable from the charging cable connection and the autonomous closure of the fuse, in particular the time period becomes constantly longer, depending on the number of the detected openings within an interval.

2. The method according to claim 1, wherein the contact state is monitored via a pilot signal on an electric connection of the cable and/or the contact state is monitored by a measurement of an ohmic resistor arranged in the cable.

3. The method according to claim 1, wherein the fuse comprises at least one load switch and/or a fault current switch.

4. The method according to claim 1, wherein, in the case of a previously detected opening, the method further comprises recording a temperature in or at the fuse.

5. The method according to claim 4, wherein, Then a maximum temperature is exceeded, the method further comprises:
   preventing the autonomous closure; and/or
   waiting a certain time until autonomous closure and/or
   reducing a charging capacity for a charging operation with respect to a standard charging capacity after the autonomous closure.

6. The method according claim 1, wherein the fuse is closed autonomously in the charging station irrespective of a communication with a control centre arranged spatially remote.

7. The method according to claim 1, further comprising closing the fuse with the aid of a motorised actuator.

8. The method according to claim 1, wherein the grid connection is multi-phase and in the case of a detected opening of a fuse on one of the phases following the detected separation of the charging cable from the charging cable connection, the method further comprises autonomously closing the fuses of all phases.

9. The method according to claim 1, wherein following autonomous closure of the fuse, the method further comprises monitoring switching state of the fuse and in the case of an opening of the fuse without a detected connection of the charging cable to the charging cable connection, transmitting an interruption signal to a spatially remote control centre.

10. The method according to claim 1, wherein when a maximum number of detected openings within the interval is exceeded, preventing the autonomous closure.

11. The method according to claim 1, wherein the interval after each detected opening is increased by a second time period.

12. The method according to claim 11, wherein the second time period is the previously determined time period.

* * * * *

UNITED STATES PATENT AND TRADEMARK OFFICE
CERTIFICATE OF CORRECTION

PATENT NO. : 11,207,998 B2  
APPLICATION NO. : 16/158571  
DATED : December 28, 2021  
INVENTOR(S) : Srdan Skrbic et al.

Page 1 of 1

It is certified that error appears in the above-identified patent and that said Letters Patent is hereby corrected as shown below:

In the Claims

Claim 5, Line 1, reads "The method according to claim 4, wherein, Then a" and should read --The method according to claim 4, wherein, when a--

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*